United States Patent
Ahmed

(10) Patent No.: US 8,209,322 B2
(45) Date of Patent: Jun. 26, 2012

(54) TABLE ELIMINATION TECHNIQUE FOR GROUP-BY QUERY OPTIMIZATION

(75) Inventor: Rafi Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 854 days.

(21) Appl. No.: 11/842,865

(22) Filed: Aug. 21, 2007

(65) Prior Publication Data

US 2009/0055349 A1 Feb. 26, 2009

(51) Int. Cl.
*G06F 7/00* (2006.01)
(52) U.S. Cl. .......................... 707/714; 707/759
(58) Field of Classification Search .................. 707/713, 707/714, 717, 718, 719, 759, 999.003–999.005
See application file for complete search history.

(56) References Cited

U.S. PATENT DOCUMENTS

| | | | |
|---|---|---|---|
| 5,495,605 A | 2/1996 | Cadot | |
| 5,588,150 A | 12/1996 | Lin et al. | |
| 5,724,570 A * | 3/1998 | Zeller et al. | 1/1 |
| 5,822,748 A | 10/1998 | Cohen et al. | |
| 5,924,088 A | 7/1999 | Jakobsson et al. | |
| 5,974,408 A | 10/1999 | Cohen et al. | |
| 6,032,143 A | 2/2000 | Leung et al. | |
| 6,061,676 A | 5/2000 | Srivastava et al. | |
| 6,339,768 B1 * | 1/2002 | Leung et al. | 707/2 |
| 6,341,281 B1 * | 1/2002 | MacNicol et al. | 1/1 |
| 6,370,524 B1 | 4/2002 | Witkowski | |
| 6,510,422 B1 | 1/2003 | Galindo-Legaria et al. | |
| 6,529,896 B1 | 3/2003 | Leung et al. | |
| 6,560,594 B2 * | 5/2003 | Cochrane et al. | 1/1 |
| 6,622,138 B1 | 9/2003 | Bellamkonda et al. | |
| 6,792,420 B2 | 9/2004 | Stephen Chen et al. | |
| 6,801,905 B2 | 10/2004 | Andrei | |
| 7,146,360 B2 | 12/2006 | Allen et al. | |
| 8,145,627 B2 * | 3/2012 | Al-Omari | 707/718 |
| 2001/0047372 A1 | 11/2001 | Gorelik et al. | |
| 2002/0147714 A1 | 10/2002 | Koo et al. | |
| 2003/0055814 A1 | 3/2003 | Chen et al. | |
| 2003/0078922 A1 * | 4/2003 | Pham et al. | 707/4 |
| 2003/0167258 A1 * | 9/2003 | Koo et al. | 707/2 |

(Continued)

OTHER PUBLICATIONS

Mumick, Maintenance of Data Cubes and Summary Tables in a Warehouse, ACM 1997, pp. 100-111.*

(Continued)

*Primary Examiner* — Robert Timblin
(74) *Attorney, Agent, or Firm* — Hickman Palermo Truong Becker Bingham Wong LLP; Daniel D. Ledesma

(57) ABSTRACT

Techniques for optimizing queries are provided. In one technique, a query optimizer determines that two tables involved in equi-joins with one other table return unique rows. The query optimizer further determines that the rows returned by one of the tables is a subset of the rows returned by the other table. The query optimizer then determines that one of the two tables involved in the equi-joins can be eliminated. In another technique, a query optimizer determines that group-by placement may be used on a query that specifies a table. The query optimizer further determines that a view that (1) replaces the table and (2) results from the group-by placement is a subset of an existing view. The query optimizer further determines that each view is unique. The query optimizer selects an execution plan that does not join any tables or views with the resulting view or with the specified table.

18 Claims, 2 Drawing Sheets

U.S. PATENT DOCUMENTS

| | | | |
|---|---|---|---|
| 2004/0220911 | A1 | 11/2004 | Zuzarte et al. |
| 2005/0033730 | A1 | 2/2005 | Chaudhuri et al. |
| 2005/0187917 | A1 | 8/2005 | Lawande et al. |
| 2006/0200451 | A1* | 9/2006 | Kosuru et al. ............ 707/3 |
| 2007/0027880 | A1 | 2/2007 | Dettinger et al. |
| 2007/0073643 | A1 | 3/2007 | Ghosh et al. |
| 2007/0185833 | A1 | 8/2007 | Turkel et al. |
| 2009/0070315 | A1 | 3/2009 | Ahmed et al. |

OTHER PUBLICATIONS

Li, Minimizing View Sets Without Losing Query-Answering Power, 2001, Springer, pp. 99-113.*

Surajit Chaudhuri, Kyuseok Shim, Including Group-By in Query Optimization, Proceedings of the 20th International Conference on Very Large Data Bases, p. 354-366, Sep. 12-15, 1994.*

Deutsch, Alin et al., "Minimization and Group-By Detection for Nested XQueries", University of California, San Diego, 2003, 15 pages.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

Ahmed, R. et al., "Cost-Based Query Transformation in Oracle" *VLDB* (2006) pp. 1026-1036.

U.S. Appl. No. 11/854,526, Sep. 12, 2007, Final Office Action, Apr. 14, 2010.

Bello, R. et al., "Materialized Views in Oracle" Sigmod, 1998 (pp. 659-664).

* cited by examiner

US 8,209,322 B2

TABLE ELIMINATION TECHNIQUE FOR GROUP-BY QUERY OPTIMIZATION

RELATED APPLICATIONS

The present application is related to U.S. patent application Ser. No. 11/716,126, entitled Efficient Interaction Among Cost-Based Transformations, filed by Rafi Ahmed and Allison Lee, on Mar. 8, 2007, the entire content of which is incorporated herein by reference.

FIELD OF THE INVENTION

The present invention relates to database systems, and in particular, to optimization of queries executed by a database system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

During query optimization, different kinds of query transformations are considered and may be evaluated one by one in a sequential manner. If a particular type of transformation increases the execution cost of a query, then a decision is made not to perform that type of transformation, even though if that type of transformation is considered together with the transformed query, the execution cost of the query might be lower.

According to an embodiment of the present invention, when a group-by placement transformation is considered for transforming a query, it is determined whether a reference to a table may be removed from the transformed query.

Figure 1:
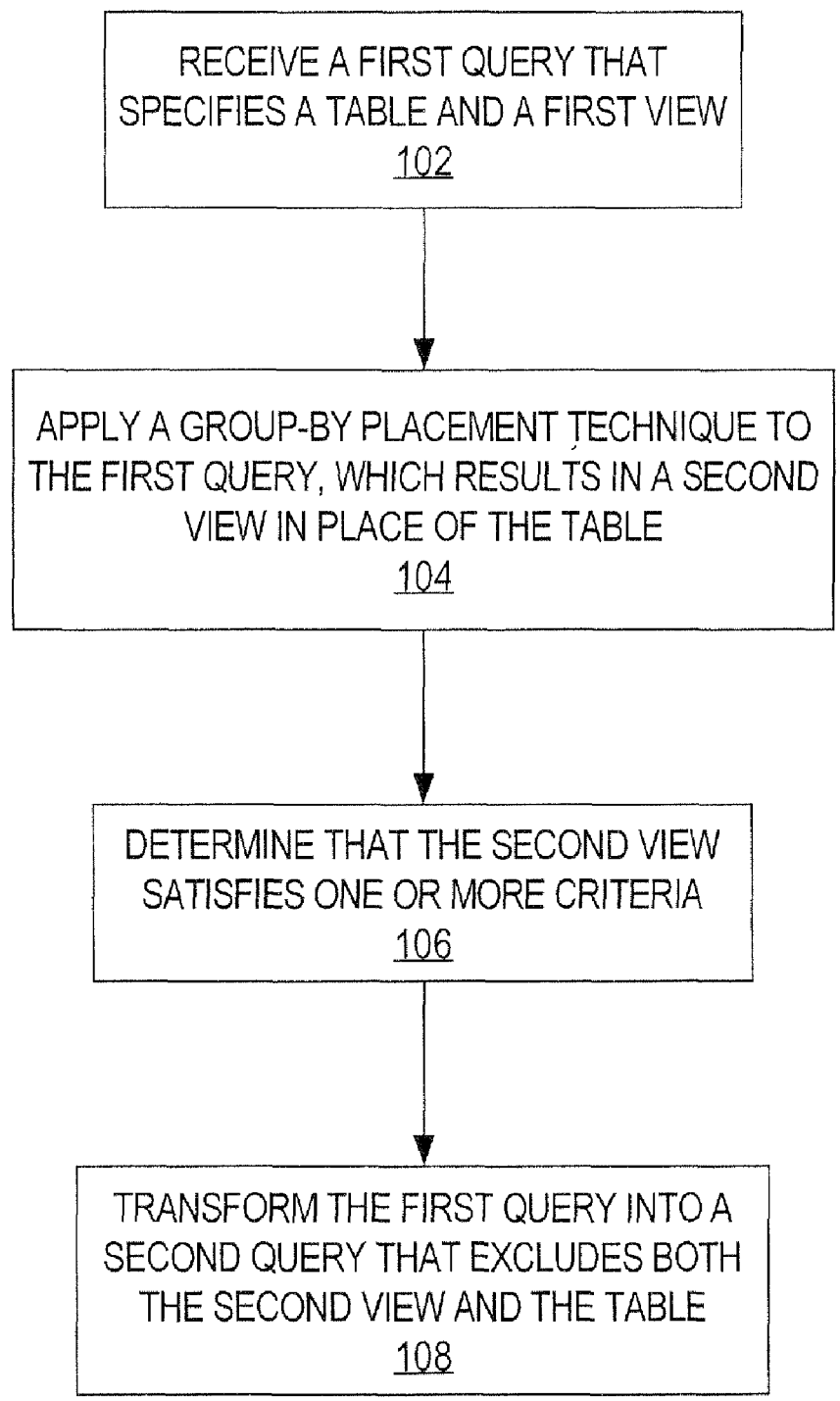
FIG. 1 is a flow diagram that illustrates how a table may be removed from a query, according to an embodiment of the invention.

In FIG. 1, at step 102, a query optimizer of a database server receives a first query. The first query specifies a table and a first view. At step 104, the query optimizer applies a group-by placement technique to the first query, which results in a second view in place of the table.

At step 106, the query optimizer determines that the second view satisfies one or more criteria. An example of the one or more criteria may be that processing the second view would return rows that are a superset of the rows that would be returned by processing the first view.

At step 108, the query optimizer transforms the first query into a second query that excludes both the second view and the reference to the table. In this way, one less join is required when executing the second query, which is semantically equivalent to the first query.

Terminology

A "subquery" is a query that is included in a WHERE clause of another query. The other query is referred to as an "outer query." The following is an example of a query:

```
SELECT T3.c, SUM (V.S)
FROM T3
WHERE T3.d =    (SELECT SUM (T2.y)
                FROM T1, T2
                WHERE   T1.x = T2.z and T2.k > 4 and
                        T3.k = T2.k)
GROUP BY T3.c;
``` where the subquery is:

```
SELECT SUM (T2.y)
FROM T1, T2
WHERE   T1.x = T2.z and T2.k > 4 and
        T3.k = T2.k
```

A "view" is similar to a subquery, but a view is included in a FROM clause of an outer query and the subquery may refer to tables in the outer query. The following is an example of a view:

```
SELECT T3.c, SUM (V.S)
FROM T3,
    (SELECT SUM (T2.y) as S, T2.d AS D
    FROM T1, T2
    WHERE T1.x = T2.z and T2.k > 4
    GROUP BY T2.d) V
WHERE T3.d = V.D
GROUP BY T3.c;
``` where the view V is:

```
SELECT SUM (T2.y) as S, T2.d AS D
FROM T1, T2
WHERE T1.x = T2.z and T2.k > 4
GROUP BY T2.d
```

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimizer and Execution Plans

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by a query optimizer.

The term query is used herein to refer to any form of representing a query, including a query in the form of a database statement or in the form of an internal query representation. A query optimizer may receive a query from another entity other than query parser, where the query received is in the form of an internal query representation.

A query optimizer generates one or more different candidate execution plans for a query. The query optimizer evaluates the one or more candidate execution plan to determine which should be used to compute the query.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. Execution plan operations include, for example, a table scan, an index scan, hash-join, sort-merge join, nested-loop join, and filter.

A query optimizer may optimize a query by transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, filter predicate move-around and pushdown, common sub-expression elimination, outer-to-inner join conversion, materialized view rewrite, star transformation, and, join predicate push down. A query is rewritten by manipulating a deep copy of the query representation to form a transformed query representation representing a transformed query. The query as transformed is referred to herein as the transformed query; the query whose copy is transformed is referred to as the base query.

A query optimizer may also perform more than one transformation for evaluation. Each transformed query generated for a query is referred to as a candidate transformed query or candidate query. A transformed query rewritten to generate another transformed query is referred to herein as a base query for the other transformed query. The query originally received by a query optimizer is referred to as the original query.

The original query an optimizer optimizes and the alternate transformed queries generated for the query are referred to individually as a "candidate query" and collectively as the "query search space." The one or more candidate execution plans generated for each query in the query search space are collectively referred to as the "plan search space."

Cost Estimation

To evaluate the candidate execution plans in the search space, a query optimizer may estimate a cost of each candidate execution plan and compares the estimated query costs to select an execution plan for execution. In an embodiment, the estimated query cost is generated by a query cost estimator, which may be a component of a query optimizer. For a plan supplied by query optimizer, a cost estimator computes and generates an estimated query cost. In general, the estimated query cost represents an estimate of computer resources expended to execute an execution plan. The estimated cost may be represented as the execution time required to execute an execution plan. To determine which candidate execution plan in the search space to execute, a query optimizer may select the candidate execution plan with the lowest estimated cost.

Group-by Placement

Group-by placement is a type of transformation that replaces one or more tables, specified in a query, with a group-by view, thereby causing an early evaluation of a group-by operation. If an outer query satisfies the following criteria, then a group-by placement transformation may be applied to the outer query: (1) the outer query references two or more tables in its FROM clause; (2) the outer query includes a group-by operator, and (3) the outer query includes an aggregation operation on a column of some of the referenced tables. Applying a group-by placement transformation to such a query produces a query that includes a group-by view in place of one or more of the referenced tables. The view includes a group-by operator on a column of one or more of the referenced tables. The following query QP is used to illustrate an example group-by placement transformation.

```
QP =   SELECT T3.C, SUM (T2.y)
       FROM T1, T2, T3
       WHERE T1.x = T2.z and T2.k > 4 and T2.d = T3.d
       GROUP BY T3.c;
```

Query QP is transformed by adding view V that includes a group-by operator to generate query QP'.

```
QP' = SELECT T3.c, SUM (V.S)
      FROM T3,
          (SELECT SUM (T2.y) as S, T2.d AS D
          FROM T1, T2
          WHERE T1.x = T2.z and T2.k > 4
          GROUP BY T2.d) V
      WHERE T3.d = V.D
      GROUP BY T3.c;
```

Removing a Table from a Query

The following is a step-by-step example of how a reference to table may be removed from a query Q1. Removal of a reference to a table is referred to herein as removal of the table.

```
Q1 = SELECT c_name, c_custkey, o_orderkey, o_orderdate,
            o_totalprice, SUM(l_quantity)
     FROM customer, orders, lineitem
     WHERE o_orderkey IN (SELECT l_orderkey
                          FROM lineitem
                          GROUP BY l_orderkey
                          HAVING SUM(l_quantity) > 300)
        and c_custkey = o_custkey
        and o_orderkey = l_orderkey
     GROUP BY c_name, c_custkey, o_orderkey, o_orderdate,
              o_totalprice;
```

In step 1, a query optimizer transforms Q1 into Q2 using a subquery unnesting transformation technique. Here, subquery unnesting replaces a subquery of an outer query with an inline view.

```
Q2 = SELECT c_name, c_custkey, o_orderkey, o_orderdate,
            o_totalprice, SUM(l_quantity)
     FROM customer, orders, lineitem,
          (SELECT l_orderkey
          FROM lineitem
          GROUP BY l_orderkey
          HAVING SUM(l_quantity) > 300) V1
     WHERE o_orderkey = V1.l_orderkey
        and c_custkey = o_custkey
        and o_orderkey = l_orderkey
     GROUP BY c_name, c_custkey, o_orderkey, o_orderdate,
              o_totalprice;
```

In step 2, the query optimizer transforms Q2 into Q3 using group-by placement and by enhancing view V1. View V1 is enhanced by adding the SUM (l_quantity) operation to the SELECT clause of view V1. View V1 of Q3 is equivalent to view V1 of Q2 except that view V1 of Q3 will return, for each row with the same orderkey value in table lineitem, the sum of the values in the quantity column of table lineitem. Q2 and Q3 are still semantically equivalent.

```
Q3 = SELECT c_name, c_custkey, o_orderkey, o_orderdate,
            o_totalprice, SUM(V2.qty)
     FROM customer, orders,
          (SELECT l_orderkey, SUM(l_quantity)
          FROM lineitem
          GROUP BY l_orderkey
```

```
          HAVING SUM(l_quantity) > 300) V1,
          (SELECT l_orderkey, SUM(l_quantity) AS qty
          FROM lineitem
          GROUP BY l_orderkey) V2
     WHERE o_orderkey = V1.l_orderkey
        and c_custkey = o_custkey
        and o_orderkey = V2.l_orderkey
     GROUP BY c_name, c_custkey, o_orderkey, o_orderdate,
              o_totalprice;
```

A query optimizer could determine that executing Q3 is (or is likely to be) more expensive than executing Q2 and, thus, the query optimizer would not consider the group-by placement as a possible transformation on Q2.

According to an embodiment of the invention, query optimizer 120 determines (as part of step 3) that V1 is a subset of V2 (or V2 is a superset of V1). In this example, V1 includes a HAVING clause, although embodiments of the invention do not require a HAVING clause. After a group-by operator is performed, a HAVING clause filters out rows from the resulting table.

Regardless of whether one of the views includes a HAVING clause, the joins of V1 and V2 are filtering joins because V1 and V2 participate in equi-joins with distinct group-by columns (i.e., V1.l_orderkey and V2.l_orderkey). The group-by operators in V1 and V2, respectively, cause the resulting l_orderkey columns to contain only unique values. Views V1 and V2 are said to be "unique" with respect to their respective group-by columns. Thus, joining V1 with V2 is redundant. If V1 and V2 were to be joined, then the result would be V1. Therefore, joining V2 with order.o_orderkey is also redundant. If at least one of V1 or V2 is not unique, then the query optimizer could not determine whether V1 is a subset of V2. Because both V1 and V2 are unique and V1 is a subset of V2, the query optimizer removes V2 from Q3 and any conditions associated with V2 to generate Q4. This is tantamount to removing the table lineitem from the outer query of Q4.

```
Q4 = SELECT c_name, c_custkey, o_orderkey, o_orderdate,
            o_totalprice, SUM(V1.sqt)
     FROM customer, orders,
          (SELECT l_orderkey, SUM(l_quantity) AS sqt
          FROM lineitem
          GROUP BY l_orderkey
          HAVING SUM(l_quantity) > 300) V1
     WHERE c_custkey = o_custkey
        and o_orderkey = V1.l_orderkey
     GROUP BY c_name, c_custkey, o_orderkey, o_orderdate,
              o_totalprice;
```

Embodiments of the invention are equally applicable if V1 appeared in the original query as opposed to appearing in a transformed query of the original query. In other words, the original query may be Q2 instead of Q1. Therefore, the subquery unnesting that was performed on Q1 is not required for some embodiments of the invention.

In some embodiments of the invention, the view that results from applying a group-by placement transformation (e.g., V2 in the above example) may be a strict subset of a view that existed before applying the group-by placement transformation (e.g., V1 in the above example). In that case, the query optimizer would remove the existing view from the original (or an intermediate) query instead of removing the resulting view.

Additionally, the query optimizer does not necessarily generate any intermediate queries when determining that an inline view generated from group-by placement is a superset of an existing view. For example, a query optimizer may analyze Q2 and, without generating Q3, determine that group-by placement will cause V2 to be generated (which is a superset of V1).

One or more of the views that are compared to determine whether one is a subset of another may include a WHERE clause. For example, V1 may have a WHERE clause and V2 does not have a WHERE clause. In this example, if the above conditions are met (e.g., V1 and V2 are unique), then V1 may be a subset of V2. As another example, if V1 and V2 have the same WHERE clause or similar WHERE clauses such that a query optimizer can determine that V1 is a subset of V2, then V2 can be eliminated.

In some embodiments of the invention, a query optimizer does not remove a table (or view) when determining whether to apply a group-by placement transformation to a query. Instead, according to an embodiment of the invention, a query that is being processed specifies a plurality of tables and at least two conditions, where a table from the plurality is either a base table or a view. One of the conditions specifies a first table that is equi-joined with a particular table. Another of the conditions specifies a second table that is equi-joined with the particular table. The query optimizer determines that (1) the first table would return a first set of rows that is a subset of a second set of rows that would be returned by the second table, (2) the first set of rows would not contain duplicate rows, (3) the second set of rows would not contain duplicate rows, and (4) each join of the first table and the second table with the third table is on the same column. In response to this determination, the query optimizer removes the second table from the query.

Note that a table is eliminated from the original query, and yet the transformed query is still semantically equivalent to the original query. Because a table is eliminated from a query, a join operation is also eliminated. Thus, (1) the time required and (2) the database resources that are conserved to execute the transformed query are significantly less.

Hardware Overview

Figure 2:
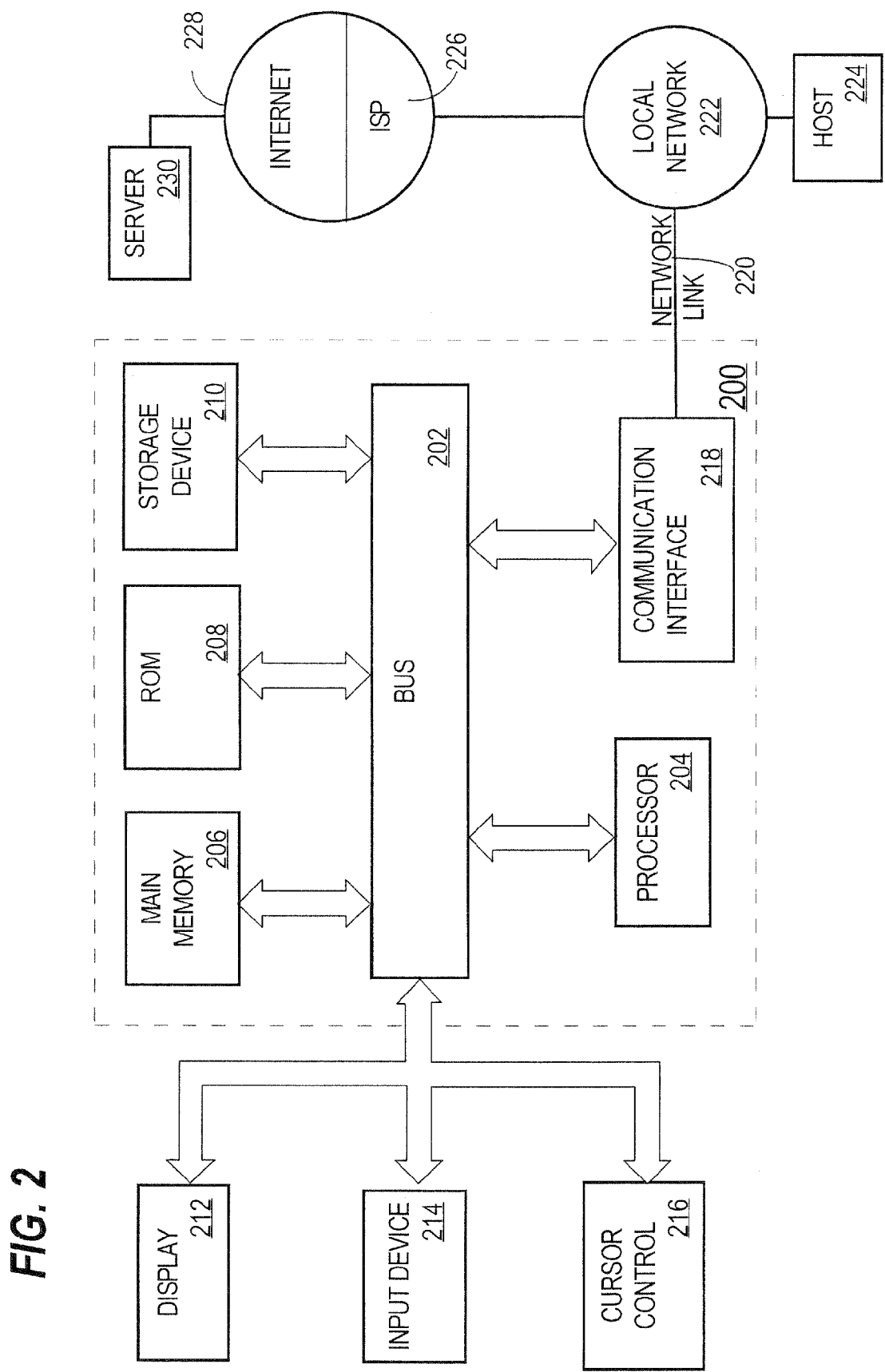
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world-wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method comprising:
    determining whether a group-by placement technique may be applied to a first query;
    wherein determining whether the group-by placement technique may be applied to the first query comprises determining whether the first query satisfies a plurality of criteria;
    wherein the first query satisfies the plurality of criteria if the first query specifies (1) a first table and a second table, (2) a group-by operator, and (3) an aggregation operation on a column of the first table or the second table;
    applying the group-by placement technique to the first query only in response to determining that the first query satisfies the plurality of criteria, wherein the group-by placement technique cannot be applied if all the plurality of criteria are not satisfied;
    wherein applying the group-by placement technique to the first query would create a rewritten query that would correspond to the first query and would specify a view instead of the first table or the second table, wherein the view would include a group-by operator;
    determining whether the view satisfies one or more criteria; and
    in response to determining that the view satisfies the one or more criteria, transforming the first query into a second query that does not specify the first table and one of the view or the second table;
    wherein method is performed by one or more computing devices.

2. The method of claim 1, wherein determining whether the view satisfies one or more criteria includes determining whether:
    one of the view or the second table would return a first set of rows that is a subset of a second set of rows that would be returned by the other of the view or the second table;
    the first set of rows would not contain duplicate rows; and
    the second set of rows would not contain duplicate rows.

3. The method of claim 1, wherein the first query is a transformed version of a previous query.

4. The method of claim 3, wherein:
    the second table is a particular view;
    the previous query does not specify the particular view.

5. The method of claim 1, wherein the second query specifies a modified version of the second table in place of the second table and does not specify the view.

6. The method of claim 1, wherein a query optimizer in a database server is performing the steps of determining and the step of transforming.

7. The method of claim 1, wherein each of the first table and the second table is one of a base table or a view.

8. A machine-implemented method comprising:
    processing a query that specifies a plurality of tables, a first condition, and a second condition;
    wherein the first condition specifies a first table, of the plurality of tables, equi-joined with a third table of the plurality of tables;
    wherein the second condition specifies a second table, of the plurality of tables, equi-joined with the third table of the plurality of tables;
    determining that (a) retrieving rows from the first table would return a first set of rows that is a subset of a second set of rows that would be returned by retrieving rows from the second table, (b) the first set of rows would not contain duplicate rows, (c) the second set of rows would not contain duplicate rows, and (d) each of the joins of the first table and the second table with the third table is on the same column; and
    in response to the determination, removing the specification of the second condition from the query.

9. The method of claim 8, wherein each of the first table and the second table is one of a base table or a view.

10. One or more non-transitory storage media storing instructions which, when executed by one or more processors, cause:
    determining whether a group-by placement technique may be applied to a first query;
    wherein determining whether the group-by placement technique may be applied to the first query comprises determining whether the first query satisfies a plurality of criteria;
    wherein the first query satisfies the plurality of criteria if the first query specifies (1) a first table and a second table, (2) a group-by operator, and (3) an aggregation operation on a column of the first table or the second table;

applying the group-by placement technique to the first query only in response to determining that the first query satisfies the plurality of criteria, wherein the group-by placement technique cannot be applied if all the plurality of criteria are not satisfied;

wherein applying the group-by placement technique to the first query would create a rewritten query that would correspond to the first query and would specify a view instead of the first table or the second table, wherein the view would include a group-by operator;

determining whether the view satisfies one or more criteria; and in response to determining that the view satisfies the one or more criteria, transforming the first query into a second query that does not specify the first table and one of the view or the second table.

11. The one or more non-transitory storage media of claim 10, wherein determining whether the view satisfies one or more criteria includes determining whether:

one of the view or the second table would return a first set of rows that is a subset of a second set of rows that would be returned by the other of the view or the second table;

the first set of rows would not contain duplicate rows; and the second set of rows would not contain duplicate rows.

12. The one or more non-transitory storage media of claim 10, wherein the first query is a transformed version of a previous query.

13. The one or more non-transitory storage media of claim 12, wherein:

the second table is a particular view;

the previous query does not specify the particular view.

14. The one or more non-transitory storage media of claim 10, wherein the second query specifies a modified version of the second table in place of the second table and does not specify the view.

15. The one or more non-transitory storage media of claim 10, wherein a query optimizer in a database server is performing the steps of determining and the step of transforming.

16. The one or more non-transitory storage media of claim 10, wherein each of the first table and the second table is one of a base table or a view.

17. One or more non-transitory storage media storing instructions which, when executed by one or more processors, cause:

processing a query that specifies a plurality of tables, a first condition, and a second condition;

wherein the first condition specifies a first table, of the plurality of tables, equi-joined with a third table of the plurality of tables;

wherein the second condition specifies a second table, of the plurality of tables, equi-joined with the third table of the plurality of tables;

determining that (a) retrieving rows from the first table would return a first set of rows that is a subset of a second set of rows that would be returned by retrieving rows from the second table, (b) the first set of rows would not contain duplicate rows, (c) the second set of rows would not contain duplicate rows, and (d) each of the joins of the first table and the second table with the third table is on the same column; and in response to the determination, removing the specification of the second condition from the query.

18. The one or more non-transitory storage media of claim 17, wherein each of the first table and the second table is one of a base table or a view.

* * * * *